US006585019B1

(12) United States Patent
Ingram

(10) Patent No.: US 6,585,019 B1
(45) Date of Patent: *Jul. 1, 2003

(54) ROTARY UNION ASSEMBLY FOR USE IN AIR PRESSURE INFLATION SYSTEMS FOR TRACTOR TRAILER TIRES

(76) Inventor: Anthony L. Ingram, 3417 Ridge Country, San Antonio, TX (US) 78247

( * ) Notice: Subject to any disclaimer, the term of this patent is extended or adjusted under 35 U.S.C. 154(b) by 0 days.

This patent is subject to a terminal disclaimer.

(21) Appl. No.: 09/522,623

(22) Filed: Mar. 10, 2000

Related U.S. Application Data

(63) Continuation of application No. 09/079,571, filed on May 14, 1998, now Pat. No. 6,105,645.

(51) Int. Cl.$^7$ .............................................. B60C 23/10
(52) U.S. Cl. ....................................................... 152/417
(58) Field of Search ................................. 152/415, 416, 152/417; 301/108.1

(56) References Cited

U.S. PATENT DOCUMENTS

| | | | | |
|---|---|---|---|---|
| 3,276,503 A | * | 10/1966 | Kilmarx | 152/417 |
| 4,883,106 A | * | 11/1989 | Schultz et al. | 152/417 |
| 5,482,358 A | * | 1/1996 | Kuck | 301/108.1 |
| 5,538,062 A | * | 7/1996 | Stech | 152/417 |
| 5,584,949 A | * | 12/1996 | Ingram | 152/417 |
| 5,752,746 A | * | 5/1998 | Perry | 301/108.1 |
| 6,105,645 A | * | 8/2000 | Ingram | 152/415 |
| 6,145,559 A | * | 11/2000 | Ingram, II | 152/417 |

* cited by examiner

Primary Examiner—Russell D. Stormer
(74) Attorney, Agent, or Firm—Lyon & Lyon LLP

(57) ABSTRACT

A rotary union assembly for use in an automatic tire inflation system for maintaining the desired pressure in the tires on a tractor trailer or other vehicle having pressurized axles. The assembly communicates the valve stems on a pair of adjacent tires with the axle interior through the use of a flexible tube extending between a stationary first fitting threadably engaged in the axle spindle and a rotary housing secured against the outside end surface of the hub cap so as to be positioned exteriorly of the wheel lubrication compartment and rotatable with the hub cap. The first fitting defines an open channel extending axially therethrough and includes an o-ring seal extending about the channel and forming an airtight seal within the fitting about the tube. A stationary shaft member having an air passageway extending axially therethrough carries the downstream end of the flexible tube and projects into the rotatable housing to communicate the axle interior with the housing through the flexible tube and provide a rotatable mounting for the housing on the shaft. The shaft defines a stationary bearing surface on its downstream end. A rotary sealing member having an air passageway extending axially therethrough is mounted within the housing for rotation therewith. The rotary sealing member defines a rotary bearing surface which is urged the stationary bearing surface on the shaft member by a spring member. Opposed channels are provided in the housing proximate the bearing surfaces and hose and valve assemblies communicate the opposed channels with the tire valve stems.

17 Claims, 4 Drawing Sheets

ROTARY UNION ASSEMBLY FOR USE IN AIR PRESSURE INFLATION SYSTEMS FOR TRACTOR TRAILER TIRES

The present application, application Ser. No. 09/522,623, filed Mar. 20, 2000, is a continuation application filed under 35 U.S.C. §120, application Ser. No. 09/079,571, filed May 14, 1998 and now U.S. Pat. No. 6,105,645.

BACKGROUND OF THE INVENTION

The present invention relates to an improved rotary assembly for use in a central tire inflation system for automatically maintaining the inflation pressure of the pneumatic tires on moving vehicles such as tractor trailers. Automatic central tire inflation systems for vehicle tires are well known and the subject of several U.S. Patents, including U.S. Pat. Nos: 3,276,503; 4,387,931; 4,883,106; 5,287,906 and 5,584,949, the disclosures of which are incorporated herein by reference.

The central tire' inflation systems employed on typical tractor trailers utilize the air compressor on the tractor as a source of pressurized air to fill a leaking tire while the trailer is in motion. The compressor directs air to the reserve air brake tank on the trailer and is set to maintain the air pressure within the tank within a range of about 100 to 125 psi, which generally corresponds to the range of typical inflation pressures in the tires used on large tractor trailers. Air from the reserve air brake tank is first directed to the braking system to maintain the air pressure in the braking system at the normal brake system level of about 70 psi. Excess air is directed from the tank through a pressure protection valve to a control box for the tire inflation system. The pressure protection valve only opens to direct the air to the control box when the air pressure in the tank exceeds 70 psi, thereby preventing air from being directed to the air inflation system which is needed for the trailer braking system. The control box contains a pressure regulator which is set to the cold tire pressure of the particular tires on the trailer so as to supply air to the tires at the desired pressure level in the event of a leak. Air is directed from the control box to the leaking tire through one of the trailer axles, which either carries an air line from the control box, or is sealed and functions as an air conduit. The pressurized air carried by the axles communicates with each pair of trailer tires mounted thereon through a rotary union assembly by which air flow is directed from a stationary air line to the valve stems on the rotating tires. Pressure responsive valves are employed between each rotary union assembly and its associated tires so that upon the occurrence of a leak in one of the tires, the resulting pressure loss will cause one of the valves to open and allow air flow from the rotary union assembly to pass therethrough to the leaking tire.

While these central tire inflation systems are well known and in widespread use, they suffer from several shortcomings. The rotary union assemblies employed in these systems have a relatively limited useful life span before the rotary seals begin to leak. The rotary seals, or rotary unions as they are frequently called, which are employed in these assemblies are generally located within the wheel lubrication compartments adjacent the ends of the axles. Accordingly, any air leakage in the rotary union seals causes an air pressure build up within the lubrication compartment which can damage the oil seals therein, and create an oil leak. If the wheel bearings loose their lubrication, they will seize up and can cause a fire. In addition to creating the potential for a dangerous fire, the positioning of the rotary union within the lubrication compartment of the wheel makes accessibility to the elements comprising the rotary union both difficult and awkward. As a result, the costs of repair and replacement are significantly increased.

The present invention provides a rotary union assembly for automatic central tire inflation systems which exhibits a substantially longer life than the rotary union assemblies heretofore in use. In addition, the assembly is configured so as to position the rotary union outside of the lubrication compartment for the vehicle wheels and thus avoids pressure build-ups within the compartment in the unlikely event of a leak in the rotary union seal. The assembly also provides ready access to the rotary union components thereof without having to enter the lubrication compartment to facilitate part replacement. As a result, the present invention provides a substantial improvement in air pressure maintenance systems for tractor trailer tires.

Other problems facing central tire inflation systems include a lack of uniformity in tractor trailer wheel hub cap configurations and off-center mountings. The former situation results in variations in the axial distance between the ends of the axle spindles and end walls of the hub caps. This distance generally determines the spacing between the air inlet of the assembly and the rotary seal therein. It would be highly desirable to provide a rotary union assembly which could readily accommodate such dimensional variations and thereby obviate the need to provide differently sized assemblies or replacement components for different hub cap configurations. The rotary union assembly should also accommodate off-center alignments of the axle spindle and hub caps without incurring additional wear on the air seals in the assembly which further shortens the life of the assembly. The rotary union assembly of the present invention achieves these objectives as well.

SUMMARY OF THE INVENTION

Briefly, the present invention is directed to a rotary union assembly for use in automatic tire inflation systems for vehicle tires and, particularly, for use in automatic inflation systems employed on tractor trailers having pressurized stationary axles. The rotary union assembly of the present invention communicates the valve stems on a pair of adjacent tires with the pressurized axle interior through the use of a stationary flexible air hose communicating at its upstream end with the axle interior through a stationary o-ring seal and at its downstream end with a rotary housing containing the rotary seal. The housing is sealably secured against the exterior surface of the end wall of the hub cap so as to be rotatable with the hub cap and tire. The o-ring seal is provided in a through flow fitting threadably secured in the extended end of the axle spindle so as to form an air tight seal about the upstream portion of the stationary air hose which allows for the length of the air hose projecting from the o-ring to the rotary housing to be readily varied by the simple insertion or retraction of line from the fitting during installation, thereby accommodating wide variations in hub cap configurations without the need for part replacement and without adversely affecting the integrity of the seal. As both the flexible air hose and the fitting through which it extends are stationary, wear is virtually eliminated at this juncture of the assembly.

The use of a flexible air hose between the axle spindle and rotary housing, allows for inadvertent off-center mountings of the rotary housing relative to the threaded fitment on the axle spindle without significantly affecting either the integrity or the life of the air seals in the assembly. Positioning the rotary housing against the exterior end surface of the hub cap locates the rotary seal formed therein outside of the lubrication compartment of the wheel and thereby prevents pressure build ups within the lubrication compartment in the event of air leakage in the rotary seal.

The rotary seal of the present invention includes an elongated stationary shaft having an air passageway extending axially therethrough. The shaft carries the downstream end of the flexible air hose and projects through and is carried by a pair of bearing members disposed in an extended portion of the rotary housing. The extended portion of the housing projects axially through the hub cap end wall such that the shaft communicates the pressurized tractor trailer axle with the interior of the rotary housing while providing a rotatable mounting of the rotary housing on the stationary shaft. A spring biased graphite element having a centrally disposed axial passageway is mounted in a fixed disposition within the housing so as to be rotatable therewith. The element is pressed against the downstream end of the elongated shaft in a flush disposition therewith to form with the shaft a rotary union by which air flow passes from the stationary flexible air hose into the rotating housing.

In the rotary housing mounted on the end wall of the hub cap, air is directed from the rotary union through two opposed channels into separate air lines which communicate with the valve stems on the pair of adjacent tires. Pressure responsive valves are provided in each of the lines to allow air flow through the appropriate line in response to a downstream pressure drop as would occur in the event of a leak in one of the tires. A normally open pressure responsive valve is also provided in each line which closes in the event of a drop in pressure upstream of the rotary union as would occur when the compressor is shut down to prevent the trailer tires from deflating. A warning light is also provided in the system for indicating to the driver the activation of the central tire inflation system.

It is the principal object of the present invention to provide an improved rotary union assembly for use in central tire inflation systems employed on tractor trailers.

It is another object of the present invention to provide a rotary assembly for use in central tire inflation systems which exhibits a substantially longer useful life than the rotary union assemblies heretofore available.

It is another object of the present invention to provide a rotary union assembly for use in a central tire inflation system for automatically maintaining the inflation pressure of the pneumatic tires on moving vehicles such as tractor trailers which reduces the possibility of a pressure build up within the lubrication compartments of the wheels.

It is a further object of the present invention to provide a rotary union assembly for a central tire inflation system which minimizes any wear in the air seals of the assembly as a result of off-center mountings between the rotary housing and air outlet in the axial spindle.

It is a still further object of the present invention to provide a rotary union assembly for use in a central tire inflation system which allows one to remove and replace the components of the rotary union exteriorly of the hub cap so as to obviate the need to remove the hub cap and risk contaminating an otherwise sealed area to effect part replacement.

It is yet another object of the present invention to provide a rotary union assembly for use in a central tire inflation system which is adaptable for use with a wide variety of differently configured wheel hub caps without the need for part replacement.

It is another object of the present invention to provide a rotary union assembly for use in a central tire inflation system which provides a high volume air flow to the tires to handle high volume air leaks and reduce the tire inflation time in the event of a flat tire.

It is still further object of the present invention to provide a rotary union assembly for use in central tire air inflation systems which is of simple construction and economical to manufacture.

These and other objects and advantages of the present invention will become readily apparent from the following detailed description taken in conjunction with the accompanying drawings.

DESCRIPTION OF THE PREFERRED EMBODIMENT IN THE DRAWINGS

Referring now in detail to the drawings, the rotary union assembly 10 of the present invention, while useable on a wide variety of movable vehicles employing stationary axles for automatically maintaining the inflation pressure of the pneumatic tires thereon, is particularly adapted for use on tractor trailers. Accordingly, the assembly 10 will be described in conjunction with a pair of adjacent vehicle tires 12 and 14 mounted on a stationary tractor trailer axle 16. While identical rotary union assemblies 10 are provided at the end of each axle on the trailer to maintain the inflation pressure of the tires carried thereby, reference will be made to only one such assembly and the pair of tires it services.

Figure 1:
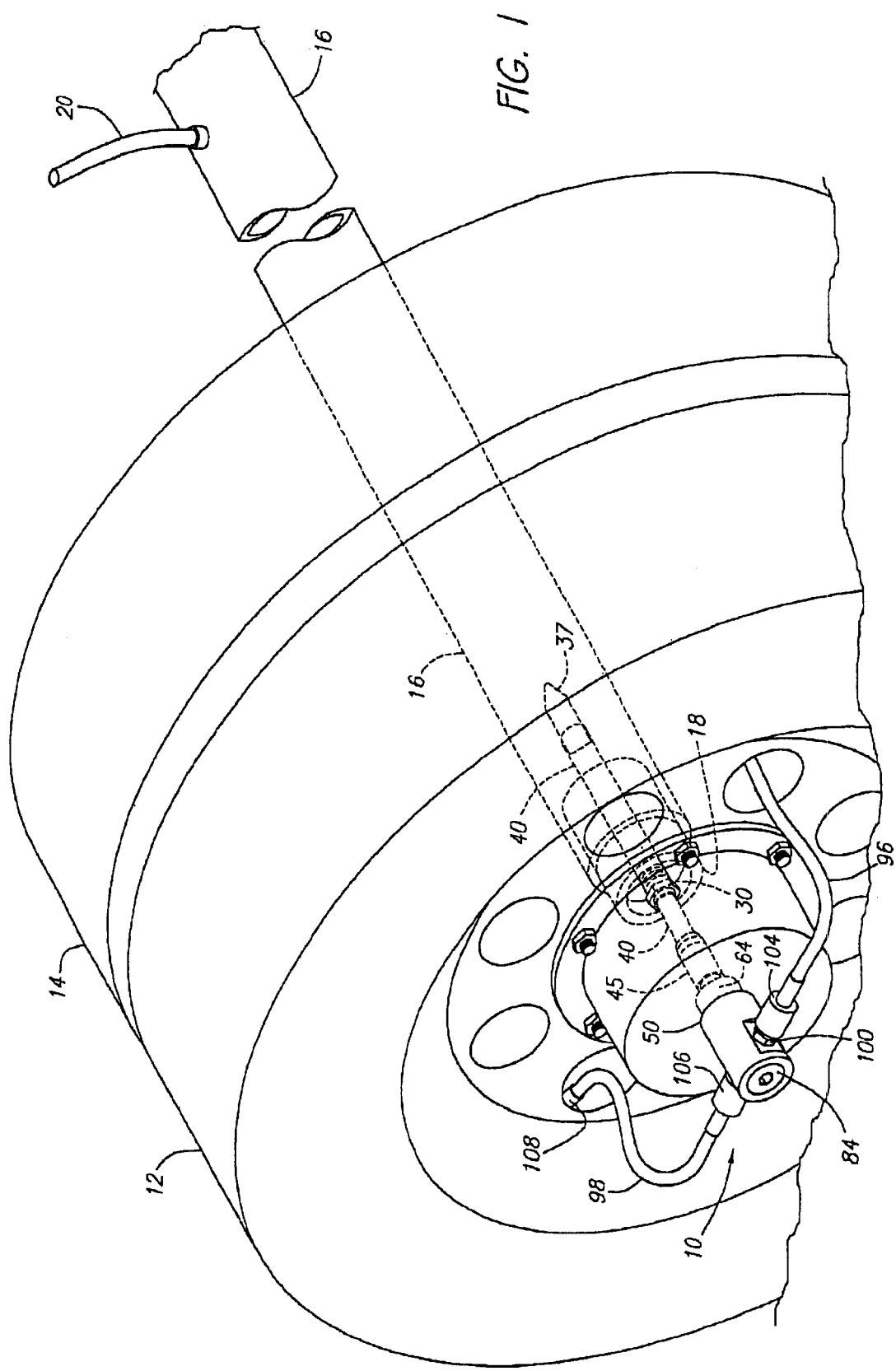
FIG. 1 is a partial perspective view of the rotary union assembly of the present invention shown secured to a hub cap on the outer wheel of a pair of tractor trailer tires mounted on a stationary axle.
Figure 2:
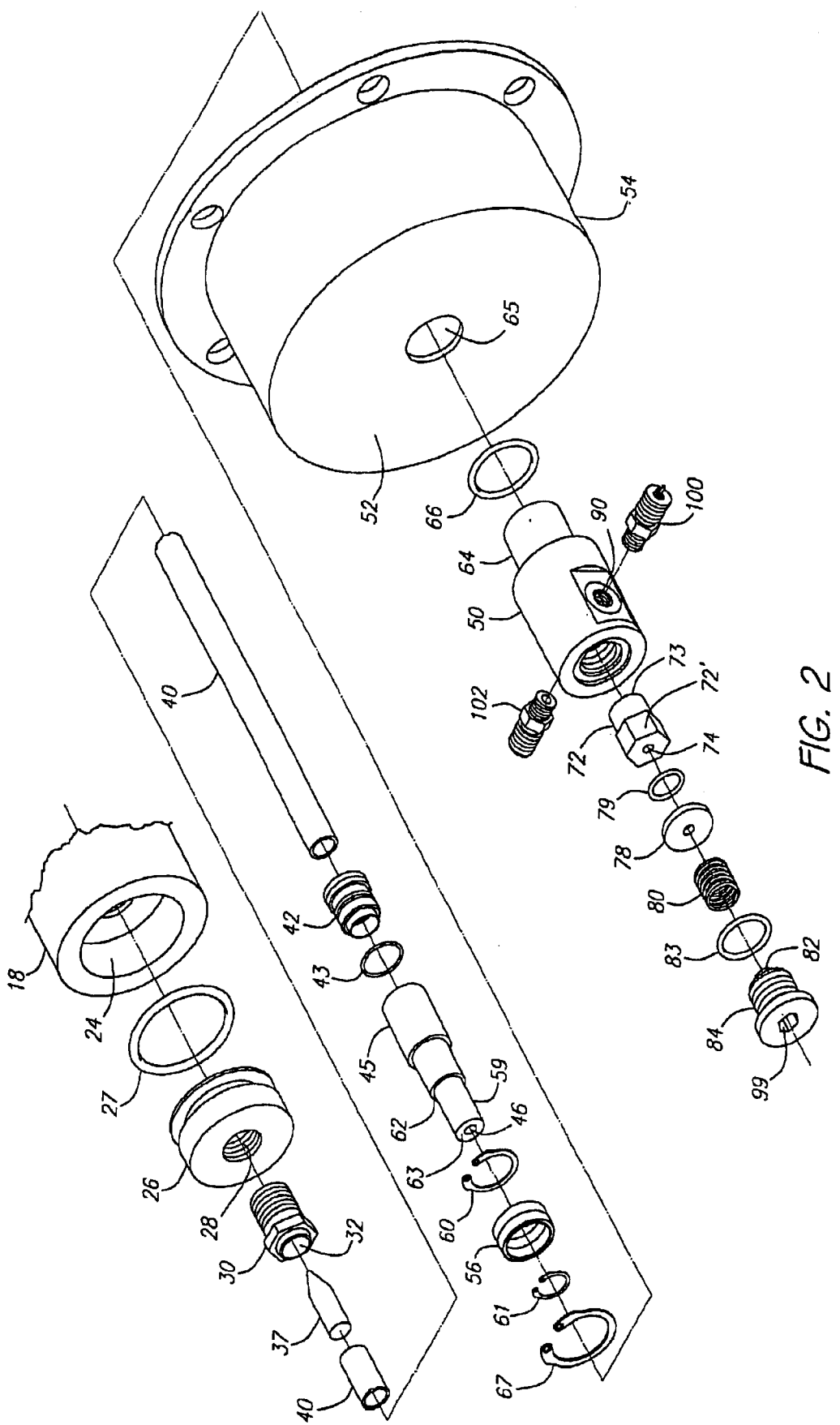
FIG. 2 is an exploded perspective, view of the components of the rotary union assembly of the present invention.
Figure 3:
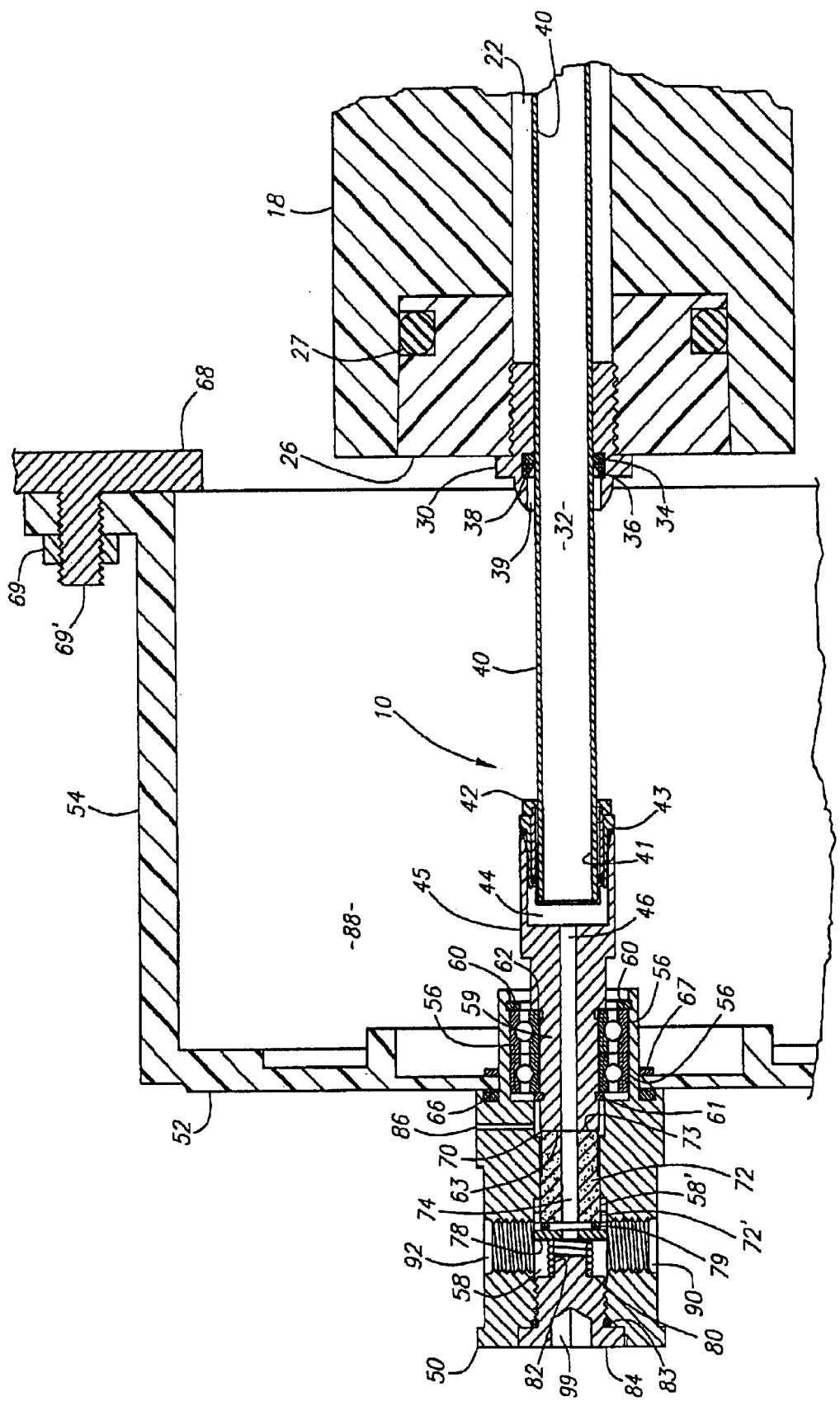
FIG. 3 is a sectional side view of the rotary union assembly of the present invention and associated axle spindle.

The trailer axle 16 which carries tires 12 and 14 is sealed and functions as an air conduit to communicate the spindles 18 welded to the extended ends of a trailer axle 16 with an air supply line 20. Air supply line 20 provides air under pressure to the interior of axle 16 from the conventional air compressor on the tractor via a standard pressure protection valve and control box (not shown) to pressurize the axle at the cold tire pressure of the trailer tires. As seen in FIGS. 2 and 3, axle spindle 18 has a centrally disposed conduit 22 extending axially therethrough which terminates at its downstream end in an enlarged cylindrical bore 24. A cylindrical plug 26 provided with an o-ring 27 mounted in a groove in its outer surface is sealably secured in bore 24. Plug 26 defines a centrally disposed axial threaded opening 28 therein. Plug 26 can be secured in bore 24 in a press fit or by means of self-tapping -threads. A through flow fitting 30 is threadably engaged in opening 28 with the threads thereon being of the NPT type and preferably coated with a suitable sealant so as to form an airtight fitment with plug 26. In an alternate embodiment of trailer axles which define solid ends, the extended ends are drilled and tapped to provide the threaded opening 28 for fitting 30.

Fitting 30 defines an open axial channel 32 extending therethrough and carries an o-ring 34 therein extending about channel 32 adjacent a seal retaining ring 36. O-ring 34 and retaining ring 36 are disposed in an offset portion 38 of channel 32 which terminates in a downstream, slightly enlarged channel portion 39 as seen in FIG. 3. A flexible air hose 40 is disposed in channel 32 and projects therethrough into conduit 22 in spindle 18 so as to communicate with the interior of pressurized axle 16. A suitable air filter 37 is provided in an upstream end portion of hose 40 within axle 16 to remove any debris from the air flow through hose 40 which might exist within the axle interior. The o-ring 34 carried in fitting 30 forms an airtight seal about air hose 40 while allowing for the hose to be axially adjusted with respect to fitting 30. The downstream end portion 41 of air hose 40 is secured within a second fitting 42 which securely grips air hose 40. A fitting marketed by Parker Hannifin Corporation under the name Presto Encapsulated Cartridge Model PPMCEN-4, tube size ¼, is ideally suited for fitting 42 for use with hose 40 having a 0.250 in. outside diameter. Flexible hose 40 is preferably constructed of a nylon or plastic material and defines a wall thickness of about 0.050 in.

Fitting 42 carries an external o-ring 43 and is sealably secured in a press fitment within a chamber 44 formed in the upstream end of an elongated steel shaft 45 axially aligned with air hose 40. Shaft 45 has an axially disposed air channel 46 extending therethrough communicating with chamber 44. Shaft 45 projects into a rotary housing 50 which is mounted exteriorly adjacent the end wall 52 of hub cap 54. Rotary housing 50 defines a channel 58 extending axially therethrough for receiving shaft 45 and the other components of the rotary union 70. A pair of high quality self-lubricating bearings 56 are mounted within housing 50 about a portion of channel 58 which receive in a press fitment a downstream portion 59 of the shaft 45 so as to provide a freely rotational mounting of the rotary housing 50 on shaft 45. Bearings marketed by NTN Bearing Corporation of America of Mt. Prospect, Ill. under the model designation W688AZZ/1K have been found to be well suited for this application. The bearings 56 are secured in place within housing 50 by retaining rings 60 and 61. The downstream portion 59 of shaft 45 which projects through bearings 56 is of a reduced diameter to define a bearings abutment shoulder 62 and a flat end face 63.

A reduced diameter portion 64 of rotary housing 50 projects through a centrally disposed aperture 65 in the end wall of hub cap 54 such that the rotary housing can be sealably secured against the exterior end wall 52 of hub cap 54 in axial alignment with the hub cap and shaft 45, flexible air hose 40 and fitting 30 by means of an exterior o-ring 66 and interior locking ring 67. The hub cap 54 is secured to the outer tire wheel 68 by means of the threaded engagement of the wheel lug nuts 69 with lug bolts 69'. Accordingly, rotation of tires 12 and 14 will effect rotation of the wheel hub cap 54 and rotary housing 50 with respect to the axially aligned and stationary shaft 46, air hose 40 and fitting 30.

The rotary union or seal 70 in rotary housing 50 is defined by the stationary elongated shaft 45, an axially aligned graphite element 72 having an open ended channel 74 extending axially therethrough, a steel washer 78, an o-ring 79 disposed between washer 78 and the downstream end of the graphite element 72, and a coil spring 80 carried by a cylindrical projection 82 on a plug 84. Plug 84 is provided with an o-ring 83 thereon and is threadably secured in a sealing engagement in the extended end of the rotary housing 50. The graphite element defines a hexagonal portion 72' which fits within a correspondingly configured portion 58' of the flow through channel 58 in rotary housing 50 such that rotational movement of housing 50 with hub cap 54 is imparted to graphite element 72. The spring member 80 when compressed to 0.25 inches produces spring force of about 5.5 to 6.0 pounds and bears against plug member 84 and washer 78 so as to urge the upstream planar end face 73 of graphite element 72 against the flush downstream adjacent planar end face 63 of the stationary shaft 45. A weep hole 86 is provided in the rotary housing 50 which communicates with channel 58 therein proximate the abutment of the rotating end face 73 on the graphite element 72 with the end face 63 of stationary shaft 45. Thus, in the event any air leakage were to occur at the rotary union 70, the air would pass to the atmosphere and not pressurize the bearings or leak past the bearings to the lubrication compartment 88 within the hub cap. In addition, a plurality of conventional duck bill type relief valves (not shown) would preferably be provided in the hub cap end wall 52, radially spaced from rotary housing 50, so that in the unlikely event an air leak within the hub cap were to occur, a pressure build up in the lubrication compartment would be avoided.

Figure 4:
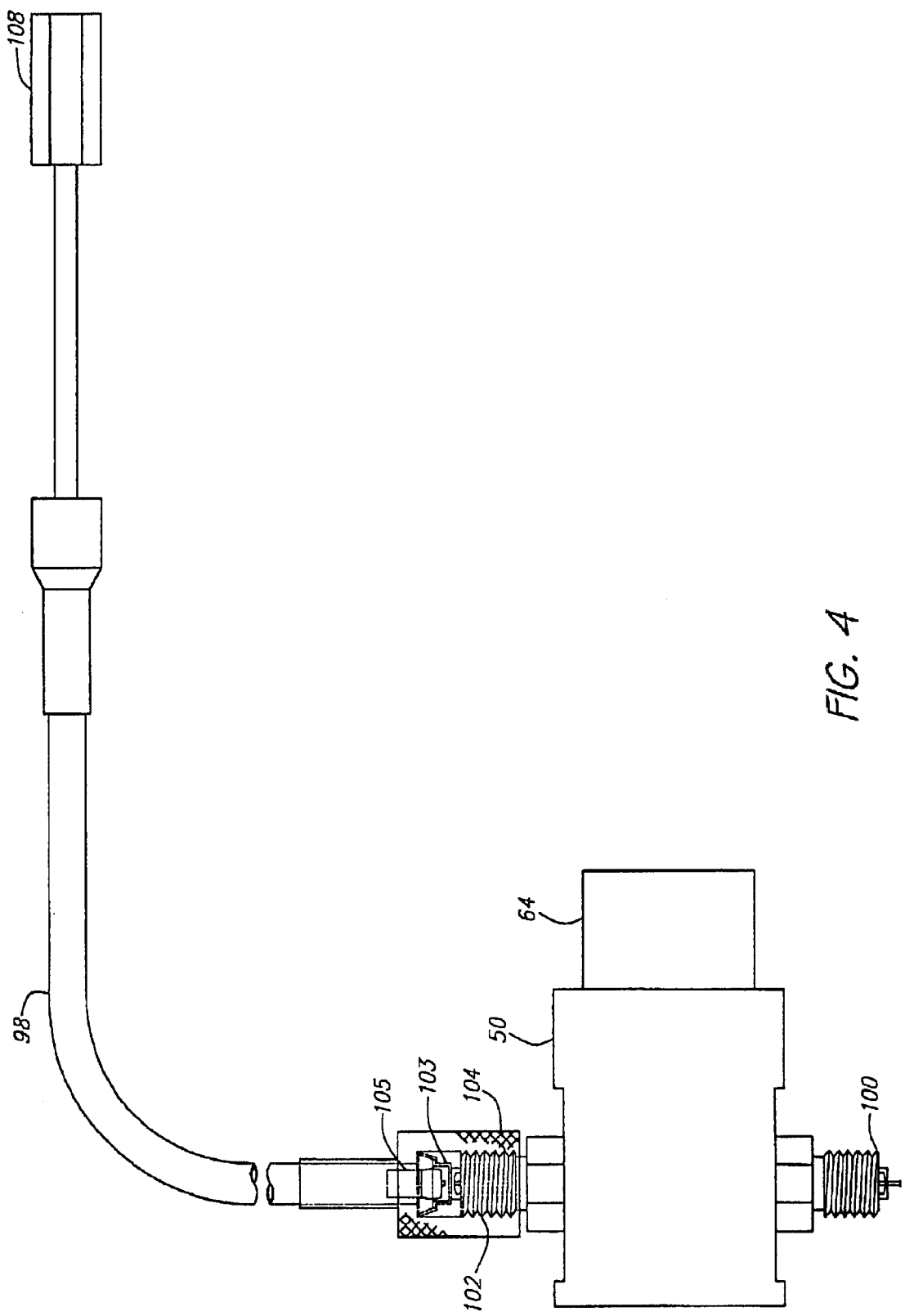
FIG. 4 is a partial side view of the rotary housing, air lines and associated valves employed in the rotary union assembly of the present invention.

A pair of oppositely aligned radial channels 90 and 92 are provided in the rotary housing 50 which communicate with the axial channel 58 therein proximate spring member 80 as seen in FIG. 3. Through the aforesaid configuration, air under pressure in axle 16 passes into and through stationary flexible hose 40, fittings 30 and 42 and the stationary shaft 45 into the rotating graphite element 72 being urged against the shaft by spring member 80. The air then passes through element 72 and into housing channels 90 and 92 for direction to the trailer tires 12 and 14 via air lines 96 and 98 (see FIG. 4). The resulting rotary seal has been found to exhibit an extremely long life without leakage. By means of the threadably engaged plug 84, which defines an Allen wrench opening 99 in the head portion thereof, ready access is provided to the interior of the rotary housing 50 and the elements comprising the rotary seal 70 disposed therein.

The opposed channels 90 and 92 in rotary housing 50 are provided with internal threads for the threaded engagement therein of Schraeder valves 100 and 102 respectively. (See FIG. 4). Valves 100 and 102 each have an opening pressure of about 90 psi and are held open by a conventional check valve depressor 103 (only one being shown) mounted in the air hoses 96 and 98 within knurled nut ends 104 and 106 carried thereby. Mounted downstream and substantially adjacent depressors 103 are a second pair of Schraeder valves 105 (only one being shown) which are normally closed and have an opening pressure of about 3 psi. Air hoses 96 and 98 project in opposed directions from rotary housing 50 to the conventional valve stems (not shown) carried on tires 12 and 14. The threaded hose fittings 108 carried by downstream ends of air hoses 96 and 98 for threaded engagement with the tire valve stems are each provided with a check valve depressor (not shown) such that upon threadably securing the air hoses to the valve stems, the check valves in the tire valve stems are maintained in an open disposition, thereby communicating the interior of tires 12 and 14 with air hoses 96 and 98.

Through the aforesaid configuration, air under a pressure corresponding to that of the cold pressure of the vehicle tires 12 and 14 is provided from axle 16 through the rotary union assembly 10 and the open Schraeder valves 100 and 102 carried by the rotary housing 50. Because the air passing through valves 100 and 102 to valves 105 is at the same pressure as the air within tires 12 and 14, valves 105 are balanced and remain closed, preventing air flow through the rotary union assembly 10. In the event of a leak in one of the tires, the resulting pressure drop downstream in air, hose 96 or 98 will create a pressure imbalance across the valve 105 mounted therein. As soon as this imbalance reaches 3 psi, the valve 105 will open, allowing air to pass therethrough to the leaking tire to maintain the desired inflation pressure within the tire. When the automatic air inflation system is shut down, the pressure within the axle remains at the tire inflation pressure. Accordingly, valves 105 remain balanced and closed so that the tires will not deflate. If the axle were to leak so that the pressure were to drop on the upstream side of valves 105, they would remain closed so that the tires would not release air to the depressurized chamber within the axle. If one were to remove one of hoses 96 or 98 from housing 50, as would occur if the hoses were damaged, valve 100 or 102 would close so that the system would not continually blow air to the atmosphere.

Finally, a warning light (not shown) is provided so as to alert the driver in the event of the activation of the automatic tire inflation system, which would be indicative of a tire leak. In addition, if one were to disconnect one of air hoses 96 or 98 from its respective tire stem, the warning light would also illuminate so that the automatic tire inflation system would not continuously pump air through the system without the knowledge of the driver. Such a warning system could comprise a microswitch in electrical communication with the wiring harness on the trailer which closes upon the activation of the control box in the automatic tire inflation system and triggers a transmitter which would send a signal to a receiving unit mounted on the front left corner of the trailer. The receiving unit would activate a plurality of LED's which would be clearly visible to the driver through the side mirror of the attached tractor.

Various changes and modifications may be made in carrying out the present invention without departing from the spirit and scope thereof. Insofar as these changes and modifications are within the purview of the appended claims, they are to be considered as part of the present invention.

I claim:

1. A rotary union assembly for use in an automatic tire inflation system for maintaining a desired pressure in a plurality of pneumatic tires mounted on the wheels of a vehicle having a source of pressurized air for fluid communication with the tires and a hub cap at the end of each axle, said assembly comprising:
   a stationary fitting carried by an end of an axle and defining an open channel extending axially therethrough;
   an annular sealing member disposed in said first fitting about said channel;
   a stationary tubular member defining an upstream end portion and a downstream end portion, said upstream end portion extending axially through said channel in said fitting into the interior of said axle and communicating with the source of pressurized air, said sealing member engaging said tubular member and forming an airtight seal within said fitting about said tubular member; and
   a housing, attachable to the exterior of a hub cap for rotation with said hub cap, said housing defining at least one air passageway extending therethrough and being rotatably mounting on said downstream end portion of said tubular member such that said tubular member communicates the source of pressurized air with said air passageway in said housing, whereby air flow is directed from said source through said stationary tubular member to said rotatable housing.

2. The assembly of claim 1 wherein said annular sealing member in said fitting is an o-ring, said o-ring preventing relative rotation between said tubular member and said fitting.

3. The assembly of claim 1 wherein said tubular member is axially translatable with respect to said sealing member in said fitting whereby the axial spacing between said fitting and said housing can be varied.

4. The assembly of claim 1 wherein said annular sealing member in said fitting is an o-ring, said o-ring preventing relative rotation between said tubular member and said fitting while allowing said tubular member to be axially translatable with respect to said o-ring whereby the durability of said airtight seal about said tubular member is enhanced and the axial spacing between said fitting and said housing can be varied.

5. The assembly of claim 1 wherein at least a portion of said tubular member is flexible whereby a sealed air flow conduit can be provided between said fitting and said housing when said housing is out of axial alignment with said fitting.

6. A rotary union assembly for use in an automatic tire inflation system for maintaining a desired pressure in a plurality of pneumatic tires mounted on the wheels of a vehicle having a source of pressurized air for fluid communication with the tires and a hub cap at the end of each axle for providing a lubrication compartment for the wheel bearings, said assembly comprising:
   a first stationary fitting carried by an end of an axle and defining an open channel extending axially therethrough;
   an annular sealing member disposed in said first fitting about said channel;
   a tube member defining an upstream end portion and a downstream end portion, said upstream end portion extending axially through said channel in said first fitting into the interior of said axle and communicating with the source of pressurized air, said sealing member engaging said tubular member and forming an airtight seal within said first fitting about said tubular member;
   a stationary shaft member having an air passageway extending axially therethrough and communicating with said tubular member;
   a housing, attachable to the exterior of a hub cap for rotation with said hub cap, said housing defining at least one air passageway extending therethrough and being rotatably mounted on said shaft member such that said air passageways in said shaft member communicates with said air passageway in said housing, whereby air flow is directed from said source through said tube member and said stationary shaft member to said rotatable housing; and
   an air hose assembly communicating said air passageway in said rotatable housing with at least one of the vehicle tires.

7. The assembly of claim 6 wherein said stationary shaft member defines a stationary planar bearing surface at one end thereof and including a rotary sealing member mounted within said air passageway in said housing for rotation with said housing, said rotary sealing member having an air passageway extending therethrough and communicating with said air passageway in said shaft member and defining a rotary planar bearing surface disposed parallel to and in abutment with said stationary planar bearing surface on said shaft, said bearing surfaces being disposed exteriorly of the lubrication compartment.

8. The assembly of claim 7 including a spring member for urging said rotatable bearing surface on said sealing member against said stationary bearing surface on said shaft member, said spring member exerting a force on said sealing member of about 5.5 to 6.0 pounds.

9. The assembly of claim 6 wherein said annular sealing member in said first fitting is an o-ring, said stationary shaft member defines a chamber in an end portion thereof communicating with said passage extending therethrough and including a second stationary fitting sealably secured in said chamber and engaging said downstream end portion of said flexible tube member for communicating said tube member with said axial passageway in said shaft member.

10. The assembly of claim 9 wherein said tube member is flexible whereby a sealed air flow conduit can be provided between said first fitting and said second fitting when said second fitting is out of axial alignment with said first fitting.

11. The assembly of claim 10 wherein said tube member is axially translatable with respect to said sealing member in said first fitting whereby the axial spacing between said first and second fittings can be varied.

12. The assembly of claim 9 wherein said stationary shaft member defines a stationary planar bearing surface at one end thereof and including a rotary sealing member mounted within said air passageway in said housing for rotation with said housing, said rotary sealing member having an air passageway extending therethrough and communicating with said air passageway in said shaft member and defining a rotary planar bearing surface disposed parallel to and in abutment with said stationary planar bearing surface on said shaft, said bearing surfaces being disposed exteriorly of the lubrication compartment.

13. The assembly of claim 12 wherein said housing defines an axial chamber therein and a pair of opposed radial channels communicating with said chamber, said shaft member and said sealing member being disposed in said axial chamber and wherein said air hose assembly communicates each of said radial passageways with one of the vehicle tires for directing air flow through said rotatable housing to said tires.

14. A rotary union assembly for use in an automatic tire inflation system for maintaining a desired pressure in a plurality of pneumatic tires mounted on the wheels of a vehicle having a source of pressurized air for fluid communication with the tires and a hub cap at the end of each axle for providing a lubrication compartment for the wheel bearings, said assembly comprising:

a first stationary fitting carried by an end of an axle and defining an open channel extending axially therethrough;

an o-ring sealing member disposed in said first fitting about said channel;

a flexible tube member defining an upstream end portion and a downstream end portion, said upstream end portion extending axially through said o-ring sealing member in said first fitting, being axially translatable with respect to said sealing member and communicating with the interior of said axle, said o-ring sealing member forming an airtight seal within said first fitting about said flexible tube member;

a stationary shaft member having an air passageway extending axially therethrough and communicating with said flexible tube member;

a housing, attachable to the exterior of a hub cap for rotation with said hub cap, said housing defining at least one air passageway extending therethrough and being rotatably mounted on said shaft member such that said air passageway in said shaft communicates with said air passageway in said housing, whereby air flow is directed from said source through said flexible tube member and said stationary shaft member to said rotatable housing; and an air hose assembly communicating said air passageway in said rotatable housing with at least one of the vehicle tires.

15. There rotary union assembly of claim 14 wherein said stationary shaft member defines a stationary planar bearing surface at one end thereof and including a rotary sealing member mounted within said air passageway in said housing for rotation with said housing, said rotary sealing member having an air passageway extending therethrough and communicating with said air passageway in said shaft member and defining a rotary planar bearing surface disposed parallel to and in abutment with said stationary planar bearing surface on said shaft, said bearing surfaces being disposed exteriorly of the lubrication compartment.

16. The assembly of claim 15 wherein said stationary shaft member defines a chamber in an end portion thereof communicating with said passage extending therethrough and including a second stationary fitting sealably secured in said chamber and engaging said downstream end portion of said flexible tube member for communicating said tube member with said axial passageway in said shaft member.

17. The assembly of claim 16 including a spring member for urging said rotatable bearing surface on said sealing member against said stationary bearing surface on said shaft member, said spring member exerting a force on said sealing member of about 5.5 to 6.0 pounds.

* * * * *